United States Patent [19]

Koehly et al.

[11] Patent Number: 4,701,308
[45] Date of Patent: Oct. 20, 1987

[54] PROCESS FOR THE RECOVERY OF MOLYBDENUM-99 FROM AN IRRADIATED URANIUM ALLOY TARGET

[75] Inventors: Gérard Koehly, Bievres; Charles Madic, Thiais, both of France

[73] Assignee: Commissariat a l'Energie Atomique, Paris, France

[21] Appl. No.: 806,815

[22] Filed: Dec. 10, 1985

[30] Foreign Application Priority Data

Dec. 28, 1984 [FR] France ............................... 84 20011

[51] Int. Cl.$^4$ ............................................. C01G 39/00
[52] U.S. Cl. ......................................... 423/2; 423/9; 252/645
[58] Field of Search ...................... 423/2, 9; 376/186; 252/626, 645

[56] References Cited

U.S. PATENT DOCUMENTS

| | | | |
|---|---|---|---|
| 3,382,152 | 5/1968 | Lieberman et al. | 423/249 |
| 3,799,883 | 3/1974 | Arino et al. | 376/186 |
| 3,821,351 | 6/1974 | Lucid | 423/9 |
| 3,900,551 | 8/1975 | Bardoncelli et al. | 423/9 |
| 3,933,971 | 1/1976 | Baucom | 423/9 |
| 3,940,318 | 2/1976 | Arino et al. | 376/186 |
| 4,093,697 | 6/1978 | Hadi et al. | 423/2 |
| 4,094,953 | 6/1978 | Hadi et al. | 376/186 |
| 4,284,472 | 8/1981 | Pomares et al. | 423/249 |
| 4,363,788 | 12/1982 | Floreancig et al. | 423/9 |

FOREIGN PATENT DOCUMENTS 2038224  1/1971  France .
2246498  5/1975  France .

OTHER PUBLICATIONS

*Chemical Abstracts*, vol. 83, 1975, p. 706, No. 157388u, Gupta et al.: "Hydroxamic Acids. XIV. Reactions of N-arylhydroxamic Acids with Metal Ions".

*Primary Examiner*—Edward A. Miller
*Attorney, Agent, or Firm*—Oblon, Fisher, Spivak, McClelland, & Maier

[57] ABSTRACT

The invention relates to a process for the recovery of molybdenum-99 from an irradiated uranium alloy target.

This process comprises the following stages:
(a) dissolving the irradiated uranium alloy target in sulphuric acid,
(b) separating the iodine and tellurium present in the thus obtained solution,
(c) oxidizing the molybdenum-99 present in the Mo (VI) solution, and
(d) extracting the thus oxidized molybdenum-99 with a hydroxamic acid of formula:

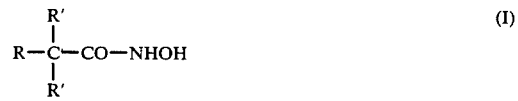

in which R is a radical chosen from the group including straight or branched-chain alkyl radicals, the phenyl radical, phenyl radicals substituted by at least one alkyl radical, arylalkyl radicals and the cyclohexyl radical and R' is a hydrogen atom or an alkyl radical.

The hydroxamic acid can be tri-n-butylacetohydroxamic acid and the molybdenum recovered can be used in a technetium generator for medical purposes.

12 Claims, No Drawings

PROCESS FOR THE RECOVERY OF MOLYBDENUM-99 FROM AN IRRADIATED URANIUM ALLOY TARGET

BACKGROUND OF THE INVENTION

The present invention relates to a process for recovering molybdenum-99 produced by fission from an irradiated uranium alloy target. More specifically, it relates to obtaining molybdenum-99 for producing technetium-99m generators for medical uses.

Among the radioisotopes used in nuclear medicine, $^{99m}$Tc occupies a preponderant position. However, this radioisotope has a very short period ($t_{\frac{1}{2}}=6$ h) and therefore it is supplied to hospitals in the form of a $^{99m}$Tc generator charged with $^{99}$Mo, which is the parent element having a longer period ($t_{\frac{1}{2}}=66$ h).

During the decay of $^{99}$Mo, $^{99}$Tc is obtained, which accumulates in the generator and can selectively be eluted therefrom by an isotonic solution, because $^{99}$Mo remains fixed to the alumina under these conditions. Following ageing, fresh doses of $^{99}$Tc can be recovered by the same procedure. The molybdenum-99 absorption capacity of the alumina columns is limited, so that obtaining $^{99m}$Tc doses with a high volume activity requires the absorption on the alumina of molybenum with a high $^{99}$Mo content.

Therefore the processes of producing $^{99}$Mo by neutron activation of natural molybdenum leading to a molybdenum of low specific activity have been abandoned for fission $^{99}$Mo production methods in accordance with the reaction:

$$^{235}U\ (n,f)\ ^{99}Mo$$

whose fission yield is 6.1%.

As the thus produced molybdenum-99 is intended for medical applications it is necessary to carefully choose the nature of the target exposed to irradiation, the irradiation conditions and the purification method, which must have high performance characteristics and take account of the following:

(a) the significant safety problems linked with the presence in the target of certain fission products, such as $^{131}$I, $^{132}$Te and $^{133}$Xe, whose chemistry is difficult to control;

(b) the need to obtain a high degree of purity of the $^{99}$Mo required for medical uses;

(c) the need to obtain a $^{99}$Mo recovery efficiency as close as possible to 100%, and (d) the need of using a minimum performance time due to the relatively short period of $^{99}$Mo.

Hitherto the targets used have either been uranium oxide targets, or uranium alloy targets, such as U-Al.

One of the methods used for recovering molybdenum-99 from targets is to dissolve the target in hydrochloric acid and then extract the molybdenum-99 from the solution obtained using di-(2-ethylhexyl)-phosphoric acid, or by liquid-liquid extraction, or by extraction chromatography.

This procedure suffers from certain disadvantages. Firstly, certain fission products, such as radioactive iodine can be given off in gaseous form at certain stages of the process. Moreover, di-(2-ethylhexyl)-phosphoric acid has a considerable affinity for uranium VI, which leads to the co-extraction of uranium VI and molybdenum-99.

Another known process consists of dissolving an irradiated uranium oxide target in a sulphuric acid solution containing hydrogen peroxide, separating the molybdenum-99 (VI) on a column containing a silver-doped activated carbon and recovering the $^{99}$Mo by elution by means of a soda solution (cf. U.S. Pat. No. 3,940,318).

However, this procedure suffers from the disadvantage of leading to the volatilization of the radioactive iodine due to the presence of the hydrogen peroxide and providing no way of separating the tellurium-132.

Moreover, French Pat. No. 2 344 499 discloses a process for recovering molybdenum-99 from irradiated uranium-aluminium alloy targets. According to this process, the irradiated target is dissolved in a sodium solution, which makes it possible to dissolve the molybdenum-99, whilst maintaining insoluble the uranium and certain fission products. Following filtration, to the filtrate is added an iodine reducing agent, an acid solution (H$_2$SO$_4$ or HCl), then zinc or metallic aluminium and the pH of the solution to 1 or 2M in SCN$^-$ ions, so as to convert the molybdenum into [Mo(SCN)$_6$]$^{3-}$, which is then extracted with di-sec-butyl ether.

This procedure makes it possible to maintain the radioactive iodine in iodide form in solution, but it does not solve the problems caused by the conditioning of these active solutions, particularly the conditioning of tellurium-132. Moreover, it leads to the production of effluents, which are highly concentrated in radiolysis-sensitive SCN$^-$ ions, which can thus be converted into cyanide ions, whilst also involving the use of a dangerous solvent, namely di-sec-butyl ether, whose treatment in the form of contaminated organic effluents is impracticable.

Thus, none of the known processes makes it possible to easily satisfy the aforementioned requirements regarding the problems of safety, purity of the molybdenum-99 and the use of an overall minimum performance time for the process.

SUMMARY OF THE INVENTION

The present invention relates to a process for recovering molybdenum-99 from an irradiated uranium alloy target meeting these requirements.

The present invention therefore relates to a process for the recovery of molybdenum-99 from an irradiated uranium alloy target wherein it comprises the following stages:

(a) dissolving the irradiated uranium alloy target in sulphuric acid, (b) separating the iodine and tellurium present in the thus obtained solution, (c) oxidizing the molybdenum-99 present in the Mo(VI) solution, and (d) extracting the thus oxidized molybdenum-99 with a hydroxamic acid of formula:

in which R is a radical chosen from the group including straight or branched-chain alkyl radicals, the phenyl radical, phenyl radicals substituted by at least one alkyl radical, arylalkyl radicals and the cyclohexyl radical and R' is a hydrogen atom or an alkyl radical.

In this process, the use of sulphuric acid for dissolving purposes makes it possible to avoid the formation of volatile elementary iodine due to the reducing power of the target to be dissolved and its chemical inertia.

Thus, when the target is constituted by a uranium-aluminium alloy, the potential imposed by the presence of the metallic uranium and aluminium makes it possible to transform the iodine compounds into iodides which remain in solution, whilst those of tellurite are transformed into elementary tellurium which precipitates. However, xenon is given off during this treatment, but can be eliminated by trapping on activated carbon.

In the process according to the invention, the use of a hydroxamic acid for extracting molybdenum-99 is very advantageous, because the hydroxamic acids of formula I have an exceptional affinity and selectivity for molybdenum (VI), which makes it possible to obtain at the end of the operation a very high degree of purity of the extracted molybdenum-99.

Thus, the process according to the invention makes it possible to solve the safety problems caused by the giving off of radioactive elements and to obtain a high degree of molybdenum purity, whilst only requiring a relatively short time for the performance thereof. Moreover, it is suitable for the treatment or processing of only slightly cooled targets, e.g. which have only been removed two days previously from a nuclear reactor. Finally, it can be performed on an industrial scale without leading to insurmountable problems of the treatment and conditioning of the effluents produced.

In order to carry out dissolving, advantageous use is made of a tantalum apparatus for the purpose of limiting corrosion. In order to prevent explosion risks and radioactive releases, this dissolving is preferably carried out in a vacuum and with the circulation of an inert gas, such as nitrogen or argon. The gaseous flux which is charged with hydrogen given off by the dissolving reaction and also xenon then passes successively into a gas washing or scrubbing means, on to silver zeolite-charged cartridges for trapping any iodine which may have been given off and on activated carbon-charged cartridges in order to retain the xenon isotopes.

The sulphuric acid used is advantageously constituted by an aqueous solution containing 0.1 to 8 mol.l$^{-1}$ of sulphuric acid.

Following this operation, the iodine and tellurium present in the dissolving solution are separated. The iodine is preferably separated by precipitation. To this end, it is possible to add to the solution at least one inactive iodide and a silver salt, such as silver nitrate in order to separate the iodine in the form of a silver iodide precipitate. The precipitate can then be separated from the solution by filtration.

In the case of tellurium, it is possible to separate the latter by precipitation, whilst adding to the solution inactive tellurium in tellurite form and also a reducing agent to reduce the tellurite into elementary tellurium, which is then separated from the solution by filtration. The reducing agent can be $SO_2$, sodium bisulphite, a titanous salt ($Ti^{3+}$) or aluminium. Preferably, use is made of aluminium and there is a simultaneous separation of the iodine and tellurium by precipitation whilst adding to the solution at least one inactive iodide, inactive tellurium in the form of tellurite and metallic aluminium, followed by a silver salt.

Followed by this iodine and tellurium separation operation, stage (c) is performed, namely the oxidation of molybdenum-99 into Mo(VI). This can be obtained by adding an appropriate oxidizing agent to the solution, e.g. a ferric salt, hydrogen peroxide or a persulphate $[S_2O_8]^{2-}$. Preferably, use is made of hydrogen peroxide.

Following this oxidation state, stage (d) of extracting molybdenum-99 by hydroxamic acid is performed, preferably using extraction chromatography.

To this end, it is possible to use an absorbent material column charged with an organic solvent containing hydroxamic acid and the solution containing the molybdenum-99 (VI) is passed on to this column. The molybdenum-99 is then recovered by the elution of the column by means of an ammonium carbonate solution.

Preferably, prior to carrying out elution, the column is washed with an acid solution, such as a sulphuric acid solution. After acidifying the eluate obtained, it is then possible to repeat the operations on a second chromatography column having smaller dimensions in order to improve the degree of purification.

The absorbent material used for carrying out this extraction chromatography can be kieselguhr, alumina or preferably a silica gel.

The organic solvent is chosen as a function of the nature of the hydroxamic acid used for the extraction. For example, said solvent can be constituted by n-heptane, benzene, xylene, mesitylene, carbontetrachloride or trichloroethane. It is also possible to use heavy alcohols or substituted benzene derivatives.

The hydroxamic acid used is in accordance with the formula:

in which R and R' have the meanings given hereinbefore.

As has been shown hereinbefore, R can represent a straight or branched-chain alkyl radical, the phenyl radical, a phenyl radical substituted by at least one alkyl radical, an arylalkyl radical or the cyclohexyl radical.

Examples of alkyl radicals which can be used are the butyl, pentyl, hexyl, octyl, decyl and dodecyl radicals. The arylalkyl radical can be the tolyl radical.

When using a phenyl radical substituted by alkyl radicals, the latter preferably have 1 to 4 carbon atoms.

R is generally an alkyl radical with 4 to 8 carbon atoms. R' can represent a hydrogen atom or an alkyl radical, whereby the latter can be branched or straight-chained. The number of carbon atoms therein is preferably 1 to 6.

In this formula, R and R' are chosen in such way that the hydroxamic acid has a very limited solubility in water and a good solubility in organic solvents. This condition is generally fulfilled when R and R' are such that the number of carbon atoms in the acid exceeds 12.

Examples of suitable hydroxamic acids are given hereinafter:
n-tetradecanohydroxamic acid of formula:

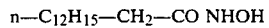

tri-n-butyl-acetohydroxamic acid of formula:

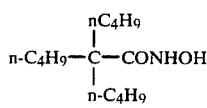

tri-i-butyl-acetohydroxamic acid of formula:

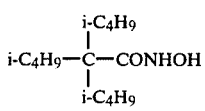

tri-n-pentyl-acetohydroxamic acid of formula:

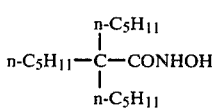

2,2'-dimethyl-dodecano hydroxamic acid of formula:

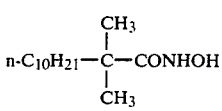

2,2'-diethyl-decano hydroxamic acid of formula:

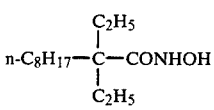

2,2'-dipropyl-octano hydroxamic acid of formula:

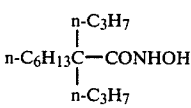

2,2',4-triethyl-octano hydroxamic acid of formula:

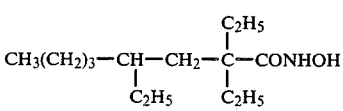

n-dodecano hydroxamic acid of formula:

α,α'-dipropyl-phenyl aceto hydroxamic acid of formula:

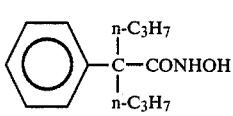

α,α'-dimethyl-S(2,4,6-trimethyl-phenyl)-propano hydroxamic acid of formula:

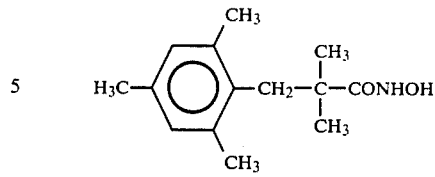

α,α'-diethyl-S(p-tolyl)-propano hydroxamic acid of formula:

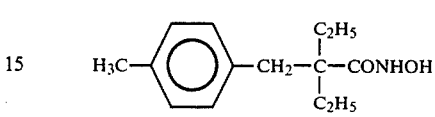

α,α'-di-n-propyl-cyclohexyl aceto hydroxamic acid of formula:

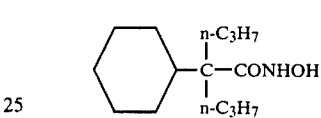

Preferably use is made of tri-n-butyl-aceto hydroxamic acid.

These hydroxamic acids can be prepared from the corrsponding carboxylic derivatives in accordance with the following reaction diagram:

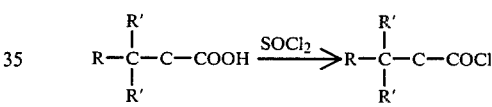

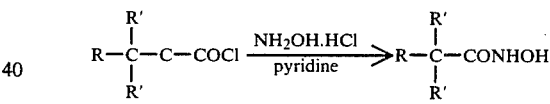

The starting carboxylic acids can be obtained from acetonitrile according to the following reaction diagram:

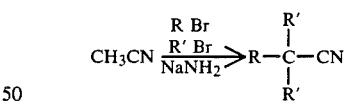

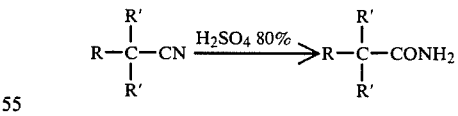

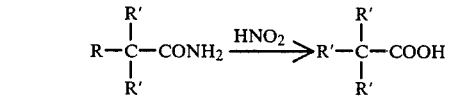

DETAILED DESCRIPTION OF THE INVENTION

The following example is obviously given in a non-limitative manner for illustrating the invention.

This example relates to the recovery of molybdenum-99 from 10 roll bonded uranium 235-aluminium targets irradiated in a nuclear reactor. Each target is formed from approximately 4 g of uranium-235 and approximately 35 g of aluminium. Following the irradiation of a target under optimum conditions, approximately 380 Ci of molybdenum-99 are formed, so that after 8 days of cooling there is a residual activity of 50 Ci of molybdenum-99. On leaving the reactor, each target contains approximately 85 mg of fission products and approximately 3.91 g of uranium-235.

These fission products represent a total activity of 6550 Ci which, after 48 hours cooling passes to 2563 Ci including 366 Ci of iodine (iodine 132 in equilibrium with $^{132}$Te inclusive), 174 Ci of $^{132}$Te and 329 Ci of xenon, mainly represented by xenon 133. The isotopes of the iodine and those of the tellurium in each case represent approximately 1 mg. Thus, for the treatment of 10 targets, essentially 25,600 Ci of fission products are used, including 3660 Ci of iodine, 1740 Ci of tellurium and 3290 Ci of xenon.

The 10 targets are dissolved in 10 liters of a 5.5 mol.l$^{-1}$ sulphuric acid solution using a tantalum dissolving apparatus. This leads to a solution containing 1.5 mol.l$^{-1}$ of aluminium, 4 g.l$^{-1}$ of uranium-235 and approximately 2500 Ci of $\beta$-$\gamma$ emitters per liter. During dissolving, 504 liters of hydrogen are given off entraining 3290 Ci of xenon. Dissolving takes place under a vacuum and with the circulation of an inert gas and at the dissolving apparatus outlet, the gaseous flux is successively passed into a gas washing or scrubbing apparatus, on to silver zeolite-charged cartridges for retaining the iodine and on to activated carbon-charged cartridges for retaining the xenon isotopes.

At the end of dissolving, 130 mg.l$^{-1}$ of inactive sodium or potassium iodides are added to dilute the 366 Ci.l$^{-1}$ of radioactive iodides from the fission processes and which represent approximately 1 mg.l$^{-1}$. Inactive tellurium is also added in the form of tellurous acid at a rate of 130 mg.l$^{-1}$, as well as 2 g.l$^{-1}$ of metallic aluminium. Thus, the tellurite is reduced to elementary tellurium and then 1.5·10$^{-3}$ mol.l$^{-1}$ of silver nitrate are added or 1.62 g of silver nitrate for the 10 liters of solution, which leads to the precipitation of silver iodide. The residual activities of the iodine and the tellurium in solution are consequently lowered to less than 1 millicurie per liter. However, the other fission products remain in solution.

The solution is then filtered and the filtered residue containing the iodine and tellurium is recovered for conditioning in tight containers, which are stored for 3 months before being despatched to the waste processing plant. This makes it possible to limit the iodine and tellurium content to less than 0.5 Ci per container.

The solution then undergoes oxidation to convert the molybdenum (III) into molybdenum (VI) and hydrogen peroxide at a rate of 5·10$^{-2}$ mol.l$^{-1}$ is added thereto for this purpose, so that the solution obtained has an acidity close to 1N. This is followed by the extraction of the molybdenum contained in this solution using a column with a diameter of 3 cm and a height of 30 cm, lined with silica gel charged with 30% of a mass of a solution containing 5·10$^{-2}$ mol.l$^{-1}$ of tributylaceto hydroxamic acid in mesitylene. After passing the solution on to the column, the silica gel is washed with approximately 1 liter of 0.1N sulphuric acid solution, followed by the elution of the molybdenum extracted on the column by means of a 10 g.l$^{-1}$ ammonium carbonate solution.

The acidity of the collected liquid is then adjusted to 1N by adding sulphuric or nitric acid. This is followed by introduction into a second chromatography column having smaller dimensions and which is also lined with silica gel charged with 30% of a mass of a solution of 5·10$^{-2}$ mol.l$^{-1}$ of tributylaceto hydroxamic acid in mesitylene. The same washing cycle is performed, followed by the elution of the second column with a 10 g.l$^{-1}$ ammonium carbonate solution and the collected liquid is purified by passage on a silica gel-filled column charged with dodecane in order to eliminate traces of organic products.

On leaving this column, a solution of molybdenum-99 is obtained in the form of ammonium molybdate containing 1800 Ci of molybdenum-99 in the case of a treatment occurring after 48 hours cooling and a treatment time lasting 24 hours. This solution can be directly used for charging a technetium generator having an alumina column on which is retained the molybdenum-99.

What is claimed is:

1. A process for the recovery of molybdenum-99 from an irradiated uranium alloy target, wherein it comprises the following stages:
(a) dissolving the irradiated uranium alloy target in sulphuric acid,
(b) separating the iodine and tellurium present in the thus obtained solution,
(c) oxidizing the molybdenum-99 present in the solution Mo(VI), and
(d) extracting the thus oxidized molybdenum-99 with a hydroxamic acid of formula:

in which R is a radical chosen from the group including straight or branched-chain alkyl radicals, the phenyl radical, phenyl radicals substituted by at least one alkyl radical, arylalkyl radicals and the cyclohexyl radical and R' is a hydrogen atom or an alkyl radical.

2. A process according to claim 1, wherein in stage (d), the solution obtained in stage (c) is passed on to a column of an absorbent material charged with an organic solvent containing hydroxamic acid.

3. A process according to claim 2, wherein the absorbent material is silica gel.

4. A process according to either of claims 2 or 3, wherein the organic solvent is mesitylene.

5. A process according to claim 2, wherein this is followed by the recovery of the molybdenum-99 extracted by hydroxamic acid by carrying out an elution of the column by means of an ammonium carbonate solution.

6. A process according to claim 2, wherein the hydroxamic acid-charged absorbent material which has extracted the molybdenum-99 is washed by means of a sulphuric acid solution and the molybdenum-99 is then recovered by carrying out an elution of the column with an ammonium carbonate solution.

7. A process according to either of claims 1 or 2, wherein the hydroxamic acid is tributyl aceto hydroxamic acid.

8. A process according to claim 1, wherein the iodine is separated by precipitation by adding to the solution at least one inactive iodide and a silver salt.

9. A process according to claim 1, wherein the tellurium is separated by precipitation by adding to the solution inactive tellurium in the form of tellurite and metallic aluminium.

10. A process according to claim 1, wherein the molybdenum is oxidixed into Mo (VI) by means of hydrogen peroxide.

11. A process according to claim 1, wherein in stage (a), use is made of an aqueous solution containing 0.1 to 8 mol.l$^{-1}$ of sulphuric acid.

12. A process according to either of claims 1 or 2, wherein the target is a uranium-aluminium alloy.

* * * * *